(12) United States Patent
Lee et al.

(10) Patent No.: US 7,312,841 B2
(45) Date of Patent: Dec. 25, 2007

(54) LIQUID CRYSTAL DISPLAY DEVICE WITH WIDE VIEWING ANGLE

(75) Inventors: Yun-Bok Lee, Seoul (KR); Yong-Sung Ham, Anyang-si (KR)

(73) Assignee: LG.Philips LCD Co., Ltd., Seoul (KR)

(*) Notice: Subject to any disclaimer, the term of this patent is extended or adjusted under 35 U.S.C. 154(b) by 0 days.

(21) Appl. No.: 10/437,982

(22) Filed: May 15, 2003

(65) Prior Publication Data
US 2003/0218705 A1 Nov. 27, 2003

(30) Foreign Application Priority Data
May 21, 2002 (KR) ............ 10-2002-0028070

(51) Int. Cl.
*G02F 1/1335* (2006.01)
*G02F 1/1337* (2006.01)
(52) U.S. Cl. ............ 349/106; 349/129; 349/96; 349/130
(58) Field of Classification Search ......... 349/106, 349/129, 96, 130
See application file for complete search history.

(56) References Cited

U.S. PATENT DOCUMENTS

| | | | |
|---|---|---|---|
| 4,691,995 A | | 9/1987 | Yamazaki et al. |
| 5,309,264 A | | 5/1994 | Lien et al. |
| 5,602,662 A | * | 2/1997 | Rosenblatt et al. ......... 349/130 |
| 5,608,556 A | | 3/1997 | Koma |
| 5,621,558 A | * | 4/1997 | Shimada et al. ............ 349/130 |
| 5,666,179 A | | 9/1997 | Koma |
| 6,100,953 A | * | 8/2000 | Kim et al. .................. 349/129 |
| 6,437,845 B1 | * | 8/2002 | Yamada et al. ............. 349/129 |
| 6,593,982 B2 | * | 7/2003 | Yoon et al. .................. 349/106 |
| 6,642,984 B1 | * | 11/2003 | Yoshida et al. ............. 349/139 |

FOREIGN PATENT DOCUMENTS

| | | |
|---|---|---|
| EP | 884 626 A2 | 12/1998 |
| JP | 6-235925 | 8/1994 |
| JP | 8-101395 | 4/1996 |
| JP | 9-61829 | 3/1997 |
| JP | 10-177178 | 6/1998 |

(Continued)

OTHER PUBLICATIONS

Y. Tanaka; Late-New Paper: A New Design to Improve Performances and Simplify the Manufacturing Process of High-Quality MVA TFT-LCD Panels; SID 99 Digest; pp. 206-209.

*Primary Examiner*—Mike Qi
(74) *Attorney, Agent, or Firm*—McKenna Long & Aldridge LLP

(57) ABSTRACT

A liquid crystal display device includes first and second substrates, first and second polarizers on outer surfaces of the first and second substrates, a gate line and a data line on the first substrate, the gate line and the data line crossing each other to define a pixel area, a thin film transistor electrically connected to the gate and data lines, a pixel electrode connected to the thin film transistor, a color filter layer on the second substrate, the color filter layer having a first concave portion, a common electrode on the color filter layer, and a liquid crystal layer between the first and second substrates, the liquid crystal layer having a negative dielectric anisotropy with chiral dopants.

8 Claims, 12 Drawing Sheets

FOREIGN PATENT DOCUMENTS

| | | |
|---|---|---|
| JP | 10-333157 | 12/1998 |
| JP | 10-333159 | 12/1998 |
| JP | 11-133438 | 5/1999 |
| JP | 11-142864 | 5/1999 |
| JP | 11-248930 | 9/1999 |
| JP | 11-326922 | 11/1999 |
| JP | 2001-215516 * | 8/2001 |
| WO | WO 00/08521 | 2/2000 |

* cited by examiner

LIQUID CRYSTAL DISPLAY DEVICE WITH WIDE VIEWING ANGLE

The present invention claims the benefit of Korean Patent Application No. 2002-28070, filed in Korea on May 21, 2002, which is hereby incorporated by reference for all purposes as if fully set forth herein.

BACKGROUND OF THE INVENTION

1. Field of the Invention

The present invention relates to a liquid crystal display (LCD) device and more particularly, to a LCD device with a wide viewing angle.

2. Discussion of the Related Art

In general, a liquid crystal display (LCD) device includes two substrates that are spaced apart and face each other with a liquid crystal layer interposed between the two substrates. Each of the substrates includes electrodes that face each other, wherein a voltage applied to each electrode induces an electric field between the electrodes and within the liquid crystal layer.

The LCD device includes various liquid crystal modes. The liquid crystal mode used also drives whether an optical film is needed as well as what type of optical film is needed.

The liquid crystal layer includes a dielectric anisotropic material. Accordingly, when an electric field is applied to the liquid crystal layer, the liquid crystal molecules form a dipole due to the spontaneous polarization. Thus, the liquid crystal molecules of the liquid crystal layer are arranged by the applied electric field. Optical modulation of the liquid crystal layer occurs according to the arrangement of the liquid crystal molecules. Therefore, images are produced and displayed by the LCD device by controlling light transmittance of the liquid crystal layer due to optical modulation.

FIG. 1 is an exploded perspective view of a liquid crystal display (LCD) device according to the related art. In FIG. 1, an LCD device 51 has upper and lower substrates 5 and 22, which are spaced apart from and facing each other, and a liquid crystal layer 11 interposed between the upper and lower substrates 5 and 22.

The upper substrate 5 includes a black matrix 6, a color filter layer 7, and a transparent common electrode 9 subsequently disposed on an interior surface thereof. The black matrix 6 has an opening such that the color filter layer 7 corresponds to the opening of the black matrix 6 and includes three sub-color filters of red (R), green (G), and blue (B).

Gate lines 12 and data lines 24 are formed on an interior surface of the lower substrate 22, whereby gate lines 12 and date lines 24 cross each other to define pixel areas P. A thin film transistor T is formed at the crossing of a gate line 12 and a data line 24. The thin film transistor T is composed of a gate electrode, a source electrode, and a drain electrode. The thin film transistors of respective gate line 12 and data line 24 crossings are arranged in a matrix. A pixel electrode 17, which is connected to the thin film transistor T, is formed within a pixel area P and corresponds to the sub-color filters. In addition, the pixel electrode 17 is made of a transparent conductive material, such as indium-tin-oxide (ITO). The lower substrate 22 may be commonly referred to as an array substrate.

In operation, a scanning pulse is supplied to the gate electrode of the thin film transistor T through the gate line 12, and a data signal is supplied to the source electrode of the thin film transistor T through the data line 24.

However, the above-mentioned LCD device has a disadvantage of a narrow viewing angle. To overcome the narrow viewing angle, various methods, such as a multi-domain method, a phase compensation method, an in-plane switching (IPS) mode, and a vertical alignment (VA) mode, have been researched and developed.

In the multi-domain method, a pixel is divided into several regions, in each of which liquid crystal molecules are differently arranged, and the pixel has average properties of the regions. In the phase compensation method, a phase difference film, which may be referred to as a retardation film, is used to reduce changes in phase difference depending on viewing angles. In the IPS mode, liquid crystal molecules move in a plane substantially parallel to the substrates according to an electric field parallel to the substrate of the LCD device. In the VA mode, liquid crystal molecules having negative dielectric anisotropy are arranged vertically with respect to the substrate by a vertical alignment layer when voltage is not applied.

Among these methods, the VA mode has an additional advantage of fast response time as compared with twisted nematic (TN) mode, which is widely used in conventional LCD devices, because of small changes of response time to gray scale. The VA mode has a response time of about 30 ms as compared with the 50 ms of the TN mode, when the transmittance of the LCD device changes from 100% to 50%.

Generally, in the VA mode, a vertical alignment material, a liquid crystal material with negative dielectric anisotropy and a negative retardation film are used. Thus, the VA mode has a wide viewing angle, and has a high contrast ratio.

FIG. 2 is a cross-section view of a VA mode LCD device according to the related art; and FIG. 3 shows a state of the VA mode LCD device to be displayed.

As shown in the figures, a pixel electrode 17 is formed on an interior surface of a first substrate 22, and a black matrix 6, a color filter layer 7 and a common electrode 9 are subsequently formed on an interior surface of a second substrate 5, which is spaced apart from and facing the first substrate 22. A liquid crystal layer 11 is interposed between the first and second substrates 22 and 5. The liquid crystal layer 11 has a negative dielectric anisotropy, and liquid crystal molecules of the liquid crystal layer 11 may be vertically arranged between the first and second substrates 22 and 5. The pixel electrode 17 is patterned according to correspond to the pixel areas.

When voltage is applied to the pixel electrode 17 and the common electrode 9, electric field E substantially perpendicular to the substrates 5 and 22 is induced between the pixel electrode 17 and the common electrode 9, and the liquid crystal molecules of the liquid crystal layer 11 are arranged substantially perpendicular to the electric field E. At this time, in edges of the pixel electrode 17, the electric field may be bent a bit.

By the way, as shown in FIG. 3, the liquid crystal molecules of the VA mode appear irregular in each pixel P1, P2, and P3 if alignment layers (not shown) are not treated by an alignment treatment such as rubbing, or slit or hole is not formed in the pixel, for example. Thus, a viewing angle is unstable, and the response time is reduced. To widen and stabilize the viewing angle, the multi-domain method may be included within the VA mode by inducing fringe field around a slit or a hole of the pixel electrode.

An embodiment of the multi-domain by the hole is disclosed in U.S. Pat. No. 6,100,953, which is hereby incorporated by reference for all purposes as if fully set forth herein and described with respect to FIGS. 4A and 4B and FIG. 5. FIG. 4A is a schematic cross-sectional view of another VA mode LCD device according to the related art; and FIG. 4B is a plan view of a color filter substrate corresponding to the VA mode LCD device of FIG. 4A. FIG. 5 shows a pixel including multiple domains according to the related art.

As shown in the figures, a pixel electrode 17 is formed on an interior surface of a first substrate 22. A second substrate 5 is spaced apart from the first substrate 22, and a black matrix 6, a color filter layer 7 and a common electrode 9 are subsequently formed on an interior surface of the second substrate 5. The color filter layer 7 has a hole 30 exposing the second substrate 5 therein.

When voltage is applied to the pixel electrode 17 and the common electrode 9, electric field E is induced between the pixel electrode 17 and the common electrode 9. Here, the induced electric field E has different distribution around the hole 30. That is, since the electric field E is distorted by the hole 30, fringe field is formed around the hole 30. Therefore, multi-domains are formed in a pixel, as shown in FIG. 5.

In FIG. 5, the liquid crystal molecules are arranged uniformly in each domain A, B and C, and the LCD device are stably displayed with symmetry. However, the VA mode LCD device has still a problem of low brightness. This problem will be explained hereinafter with reference to FIG. 6. FIG. 6 schematically shows a plan view of the VA mode LCD device according to the related art when voltage is applied to the liquid crystal material.

In FIG. 6, liquid crystal molecules 11 are disposed between first and second polarizers, wherein optical axes 50 and 52 of the polarizers cross at right angles. The second polarizer, from which light is emitted, is usually referred to as an analyzer. The liquid crystal molecules 11 have negative dielectric anisotropy. As illustrated in FIG. 6, when voltage is applied to electrodes (not shown), the liquid crystal molecules 11 are arranged such that long axes of the liquid crystal molecules 11 are horizontal, that is, parallel to the substrates. By the way, the liquid crystal molecules 11 in regions F and G are parallel to the optical axes 50 and 52 of the first and second polarizers, respectively. Thus, light is not emitted in the regions F and G, and black state regions are formed in a white image. Since the black regions are shown on the substrate of the LCD device, white brightness is lowered.

To solve the problem, a VAC (vertical alignment with chiral dopants) mode, wherein chiral dopants are mixed with liquid crystal molecules to be vertical aligned, has been proposed, as shown in FIG. 7. FIG. 7 schematically shows a plan view of a VAC mode LCD device according to the related art when voltage is applied to liquid crystal molecules.

As shown in FIG. 7, the liquid crystal molecules 11 have a twisted structure between first and second polarizers due to a helical characteristic of chiral dopants. Thus, in regions F and G, where the liquid crystal molecules 11 are parallel to optical axes 50 and 52 of the polarizers, respectively, light is emitted due to birefringence of the liquid crystal molecules 11, and brightness is improved.

FIG. 8 shows transmittance (that is, brightness) versus voltage characteristics of a related art VA mode and a related art VAC mode. As shown in FIG. 8, the VAC mode has higher transmittance than the conventional VA mode at the same voltage.

SUMMARY OF THE INVENTION

Accordingly, the present invention is directed to a liquid crystal display device with a wide viewing angle that substantially obviates one or more of problems due to limitations and disadvantages of the related art.

An advantage of the present invention is to provide a liquid crystal display device with a wide viewing angle that improves brightness.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates, a first polarizer having a first optical axis on an outer surface of the first substrate, a second polarizer having a second optical axis on an outer surface of the second substrate, a gate line and a data line on the first substrate, the gate line and the data line crossing each other to define a pixel area, a thin film transistor electrically connected to the gate and data lines, a pixel electrode connected to the thin film transistor, a color filter layer on the second substrate, the color filter layer having a first concave portion, a common electrode on the color filter layer, and a liquid crystal layer between the first and second substrates, the liquid crystal layer having a negative dielectric anisotropy with chiral dopants.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 1:
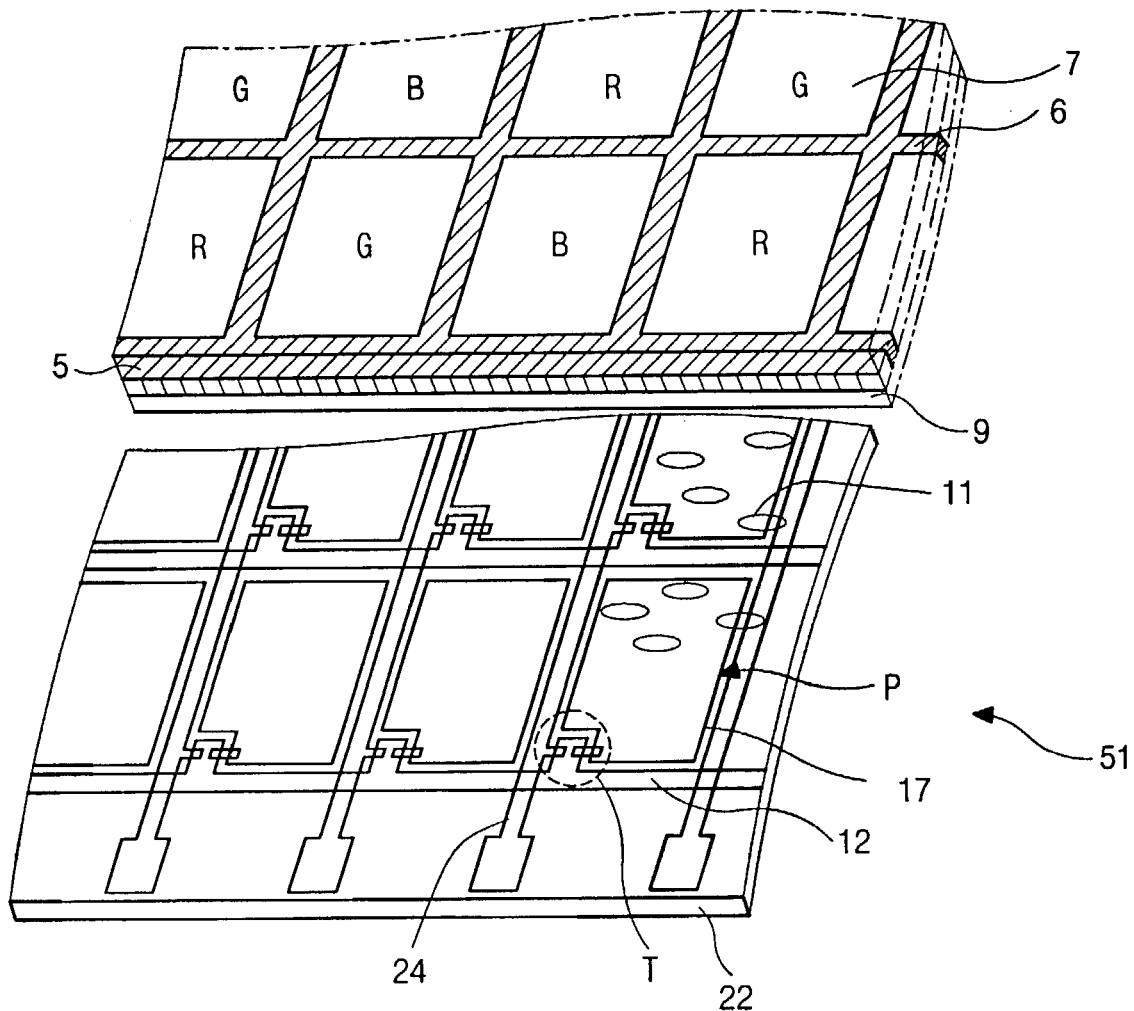
FIG. 1 is an exploded perspective view of a liquid crystal display (LCD) device according to the related art.
Figure 2:
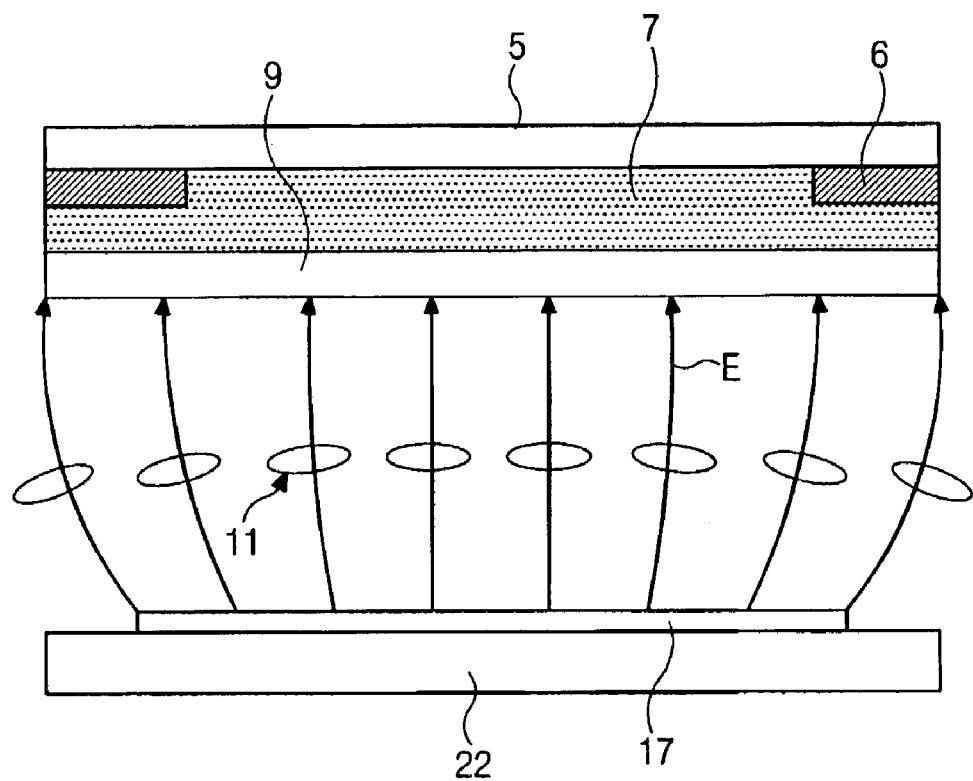
FIG. 2 is a cross-section view of a VA (vertical alignment) mode LCD device according to the related art.
Figure 3:
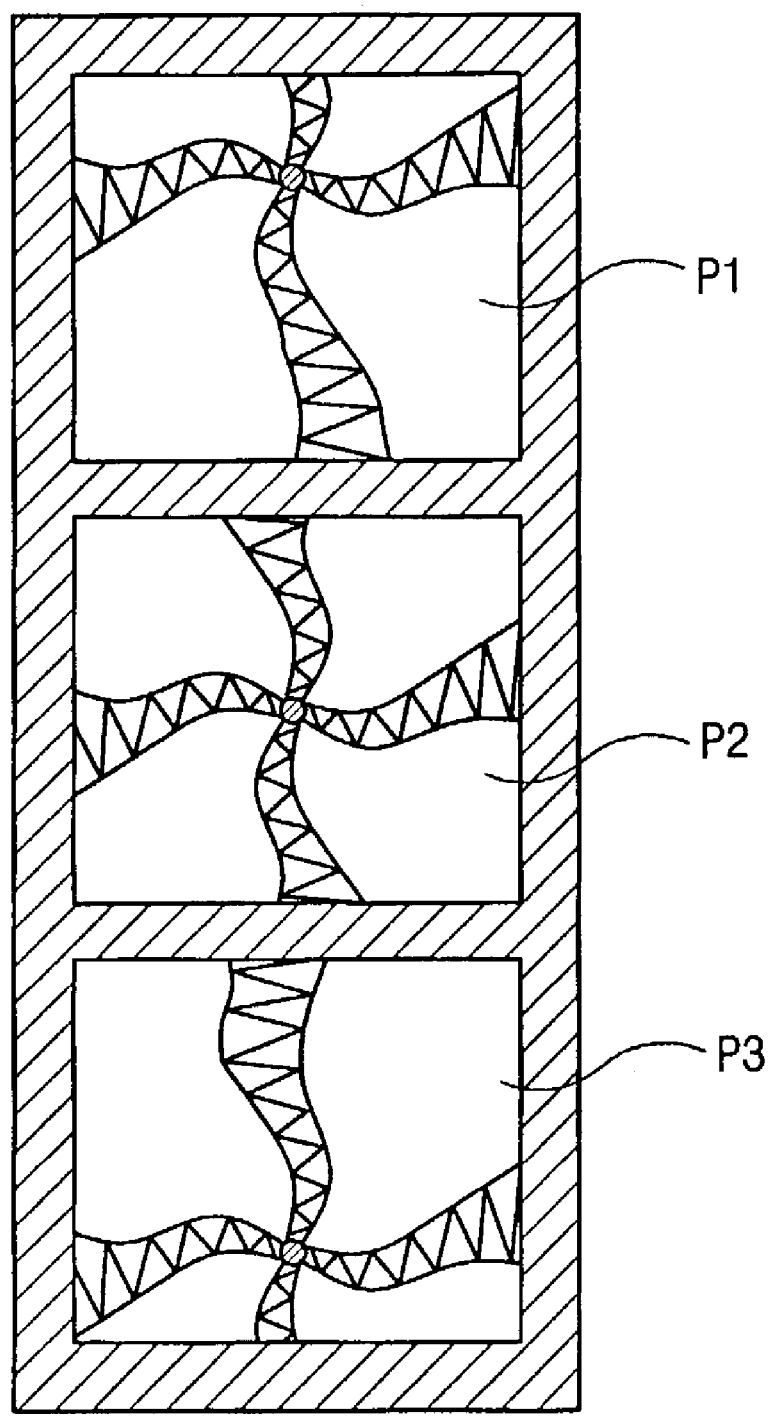
FIG. 3 is a view showing a state of the VA mode LCD device to be displayed according to the related art.
Figure 4A:
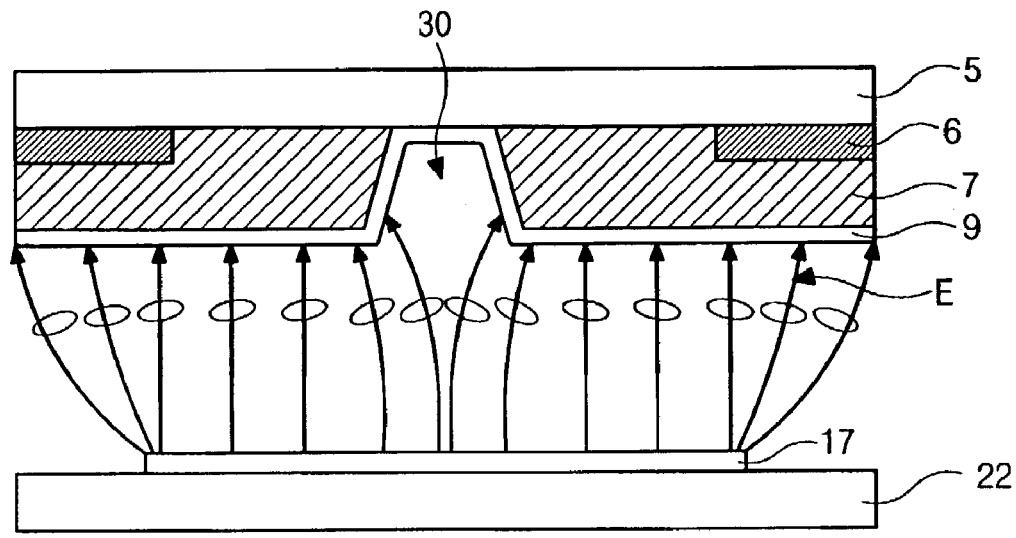
FIG. 4A is a schematic cross-sectional view of another VA mode LCD device according to the related art.
Figure 4B:
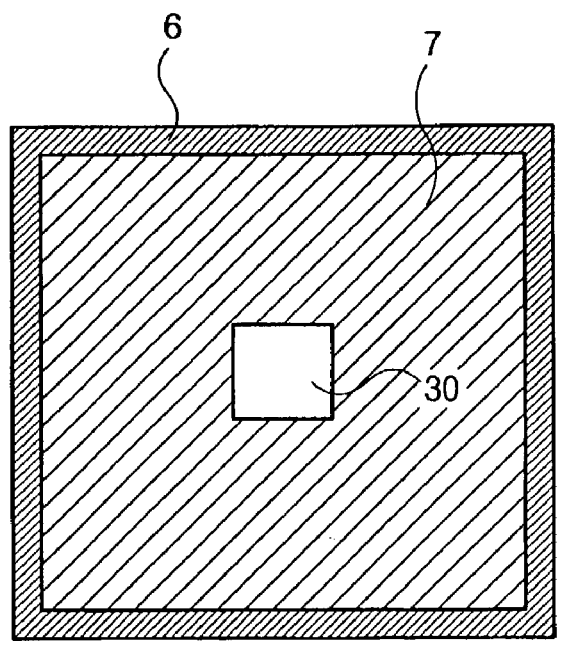
FIG. 4B is a plan view of a color filter substrate corresponding to the VA mode LCD device of FIG. 4A.
Figure 5:
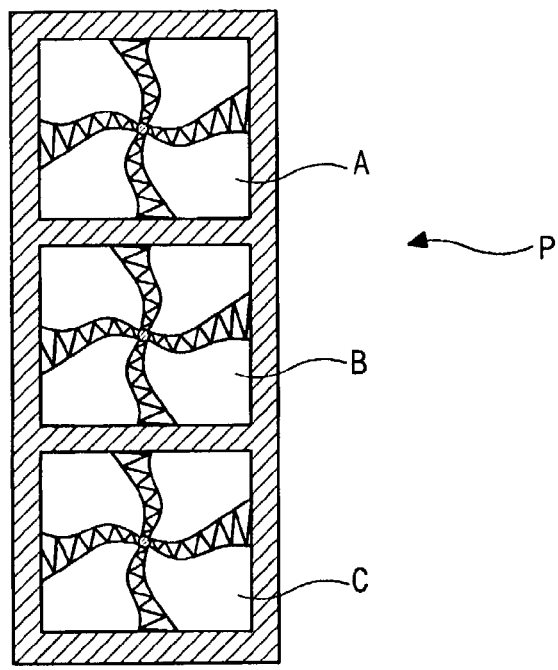
FIG. 5 is a view of a pixel including multi domains according to the related art.
Figure 6:
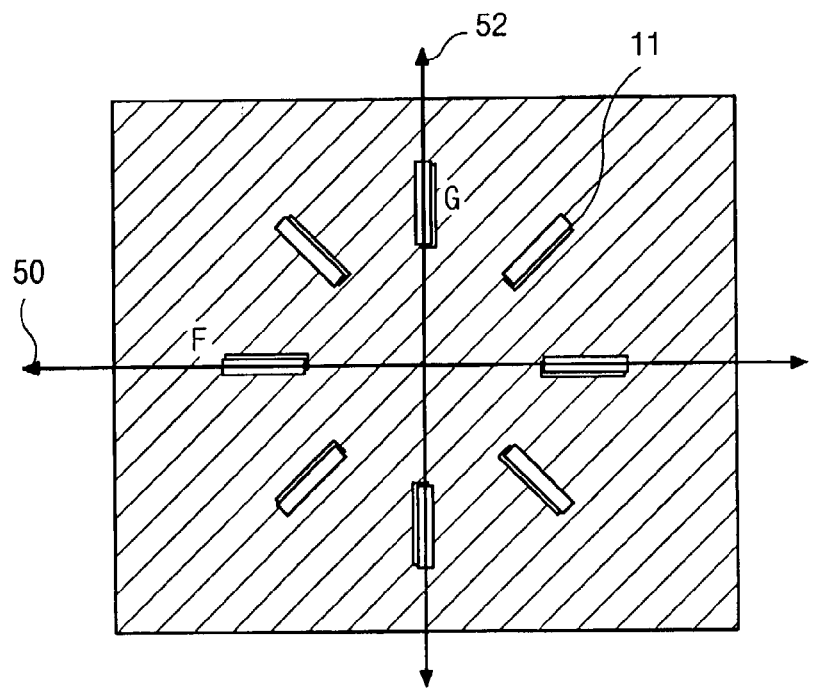
FIG. 6 is a schematic plan view of the VA mode LCD device according to the related art when voltage is applied to a liquid crystal layer.
Figure 7:
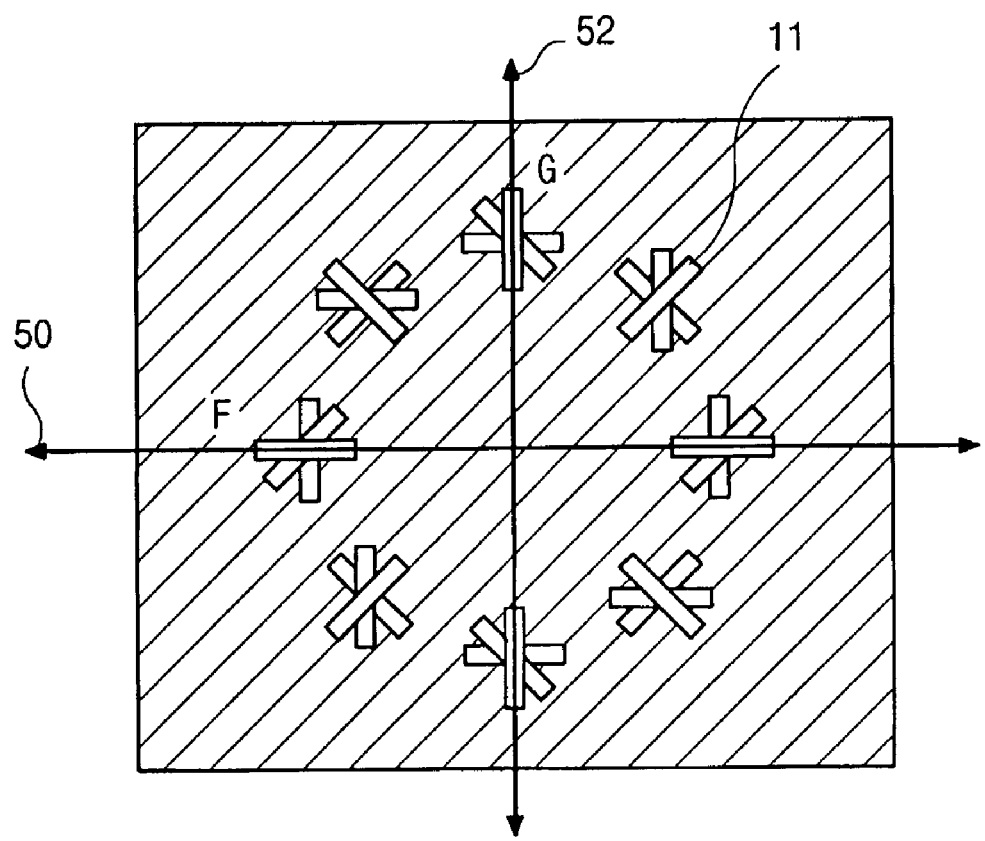
FIG. 7 is a schematic plan view of a VAC (vertical alignment with chiral dopants) mode LCD device according to the related art when voltage is applied to liquid crystal molecules.
Figure 8:
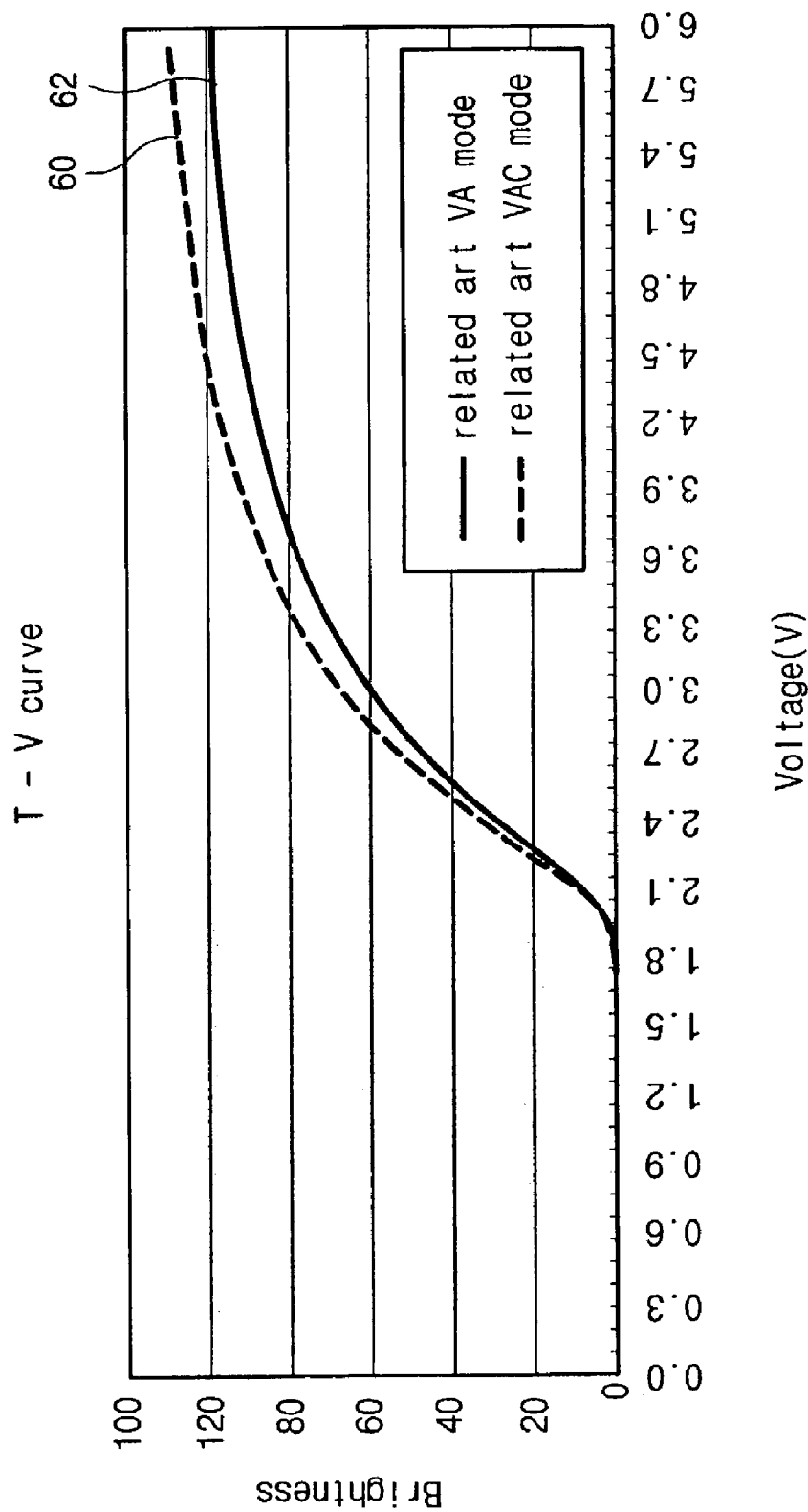
FIG. 8 is a graph showing transmittance versus voltage characteristics of a related art VA mode and a related art VAC mode.
Figure 9:
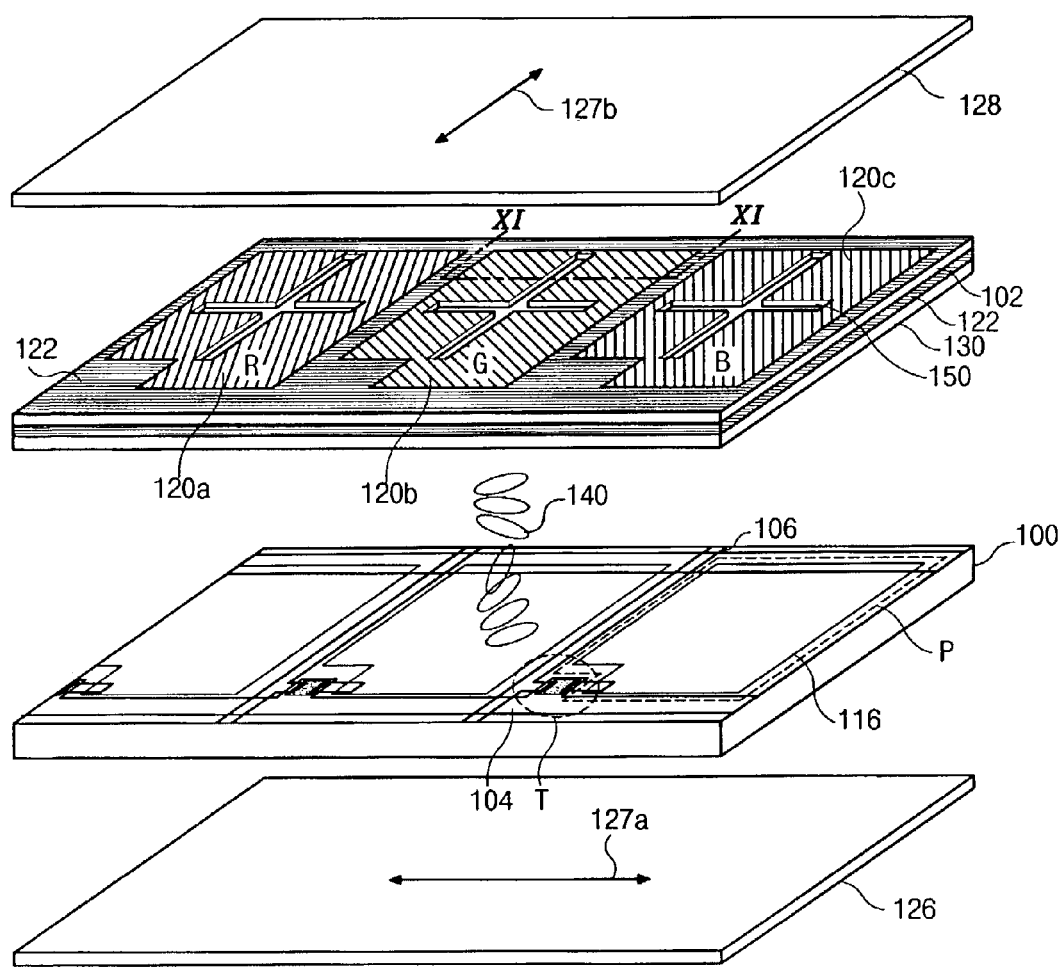
FIG. 9 is a perspective view of a VAC mode LCD device according to an embodiment of the present invention.
Figure 10:
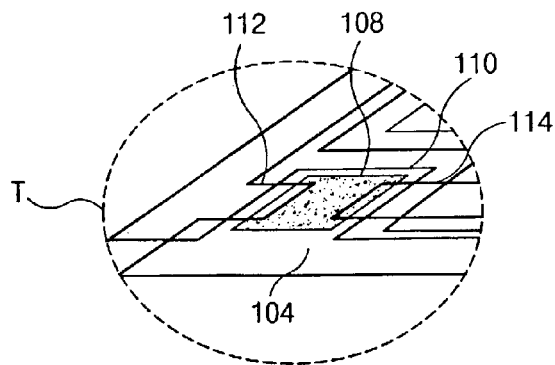
FIG. 10 is an enlarged view of a thin film transistor of the VAC mode LCD device in FIG. 9.

FIG. 9 is a perspective view of a VAC (vertical alignment with chiral dopants) mode LCD (liquid crystal display) device according to an embodiment of the present invention, and FIG. 10 is an enlarged view of a thin film transistor of the VAC mode LCD device in FIG. 9.

As illustrated in FIGS. 9 and 10, first and second substrates 100 and 102 are spaced apart, and first and second polarizers 126 and 128 are disposed on outer surfaces of the first and second substrates 100 and 102, respectively. Optical axes 127a and 127b of the first and second polarizers 126 and 128 are substantially perpendicular to each other. The first and second substrates 100 and 102 are made of a transparent insulating material.

A gate line 104 and a data line 106 are formed on an inner surface of the first substrate 100. The gate line 104 and the data line 106 cross each other to define a pixel area P. A thin film transistor T is formed at a crossing of the gate line 104 and the data line 106. The thin film transistor T includes a gate electrode 110 that is connected to the gate line 104, a source electrode 112 that is connected to the data line 106, a drain electrode 114 that is spaced apart from the source electrode 110, and an active layer 108 that is disposed between the gate electrode 110 and the source and drain electrodes 112 and 114. A pixel electrode 116 is formed in the pixel area P and is connected to the drain electrode 114.

A black matrix 122 is formed on an inner surface of the second substrate 102. The black matrix 122 has an opening, which corresponds to the pixel area P. In the opening, a color filter layer, which is composed of three sub-color filters 120a, 120b and 120c, is formed. A transparent common electrode 130 is formed on the color filter layer.

A liquid crystal layer 140 is disposed between the first and second substrate 100 and 102. The liquid crystal layer 140 has a negative dielectric anisotropy and includes chiral dopants.

Here, each sub-color filter layer 120a, 120b and 120c has a hole or groove 150, which is parallel to optical axes 127a and 127b of the first and second polarizers 126 and 128. Then, in the hole or groove 150, light passing through the LCD device is not absorbed by the color filter layer, and thus brightness is improved in a white state. In FIG. 9, though the hole or groove 150 has a crisscross shape, the hole or groove 150 may have other shapes, such as a stripe.

Figure 11A:
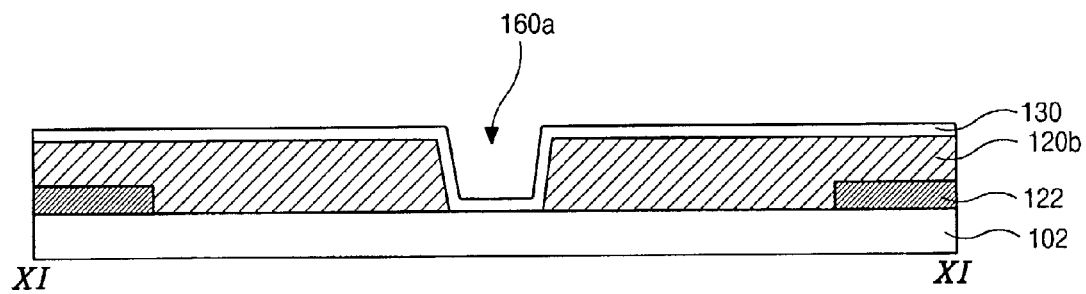
FIGS. 11A and 11B are cross-sectional views along the line XI-XI of FIG. 9.
Figure 11B:
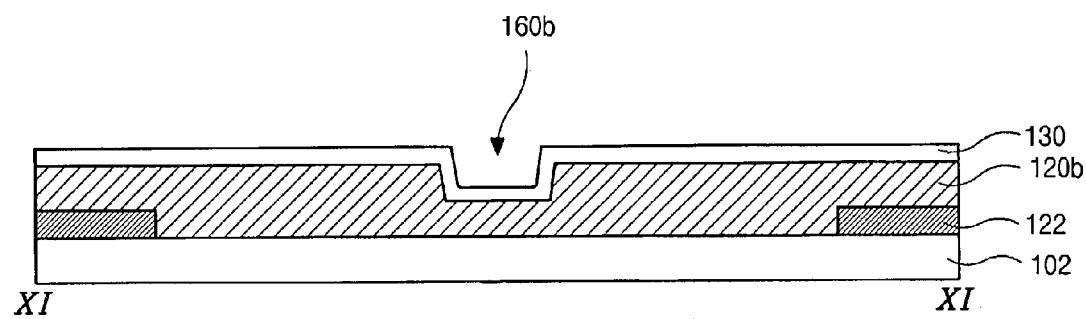

FIGS. 11 and 11B are cross-sectional views along the line XI-XI of FIG. 9.

In FIGS. 11A and 11B, a black matrix 122 is formed on a substrate 102, and a color filter layer 120b is formed on the black matrix 122. Subsequently, a common electrode 130 is formed on the color filter layer 120b. The color filter layer 120b has a hole 160a by entirely etching any portion thereof, as illustrated in FIG. 11A, or a groove 160b by partially etching any portion, as shown in FIG. 11B. The hole 160a or the groove 160b is parallel to at least one of the optical axes 127a and 127b of the first and second polarizers 126 and 128 of FIG. 9. As stated above, the hole 160a or the groove 160b may have a crisscross shape or a stripe shape.

Figure 12:
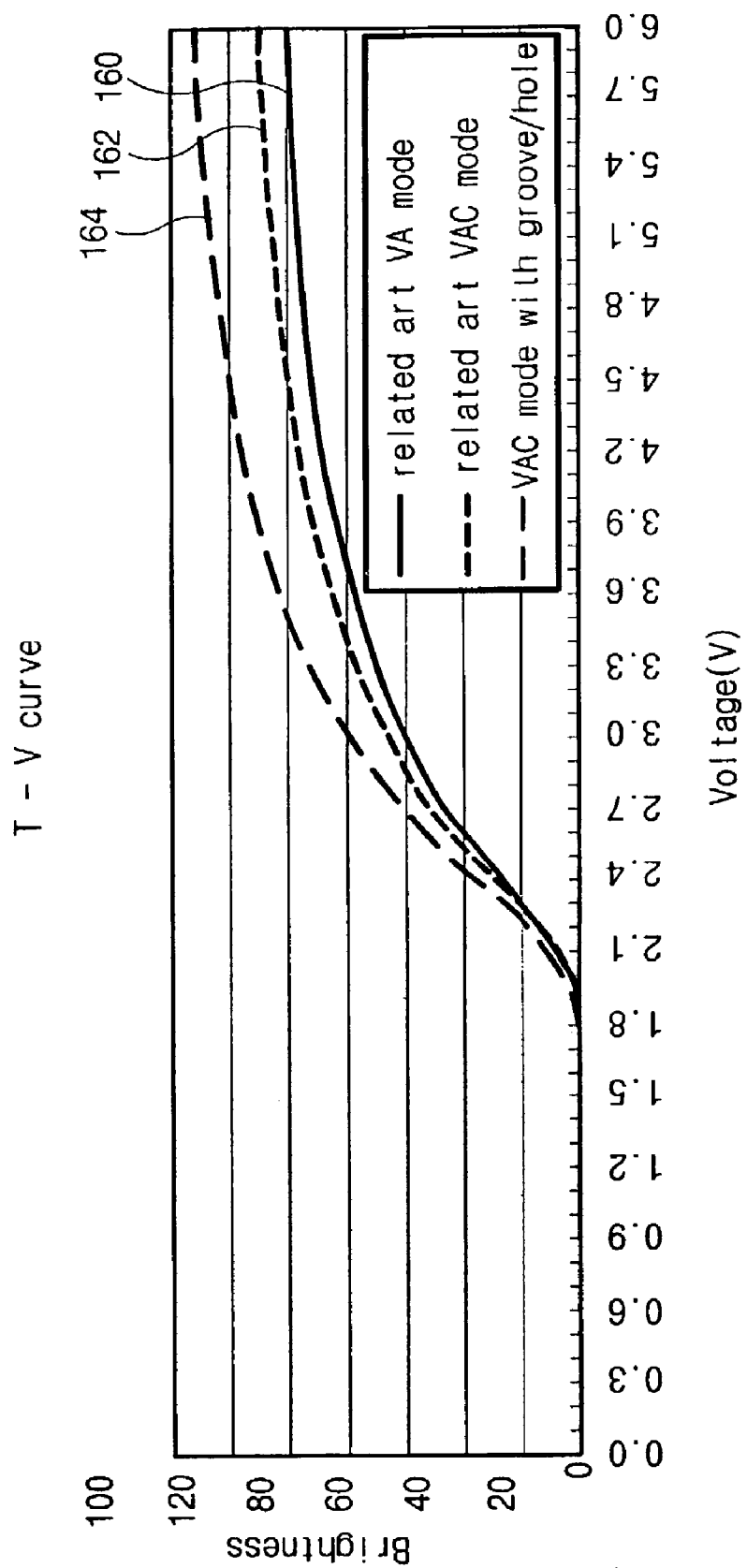
FIG. 12 is a graph showing a transmittance versus voltage characteristic of the VAC mode LCD device including a color filter layer with a groove according to the embodiment of the present invention.

FIG. 12 illustrates a transmittance (that is, brightness) versus voltage characteristic of the VAC mode LCD device including a color filter layer with a groove according to the embodiment of the present invention. FIG. 12 also shows transmittance versus voltage characteristics of a related art VA mode and a related art VAC mode. As shown in FIG. 12, the related art VAC mode has higher transmittance than the related art VA mode at the same voltage, and the VAC mode with the groove or hole of the present invention has higher transmittance than the related art VAC mode. Thus, brightness is improved in the VAC mode with the groove or hole.

If the VAC mode LCD device has a hole that exposes a substrate, as shown in FIG. 11A, brightness increases more than the groove.

Figure 13A:
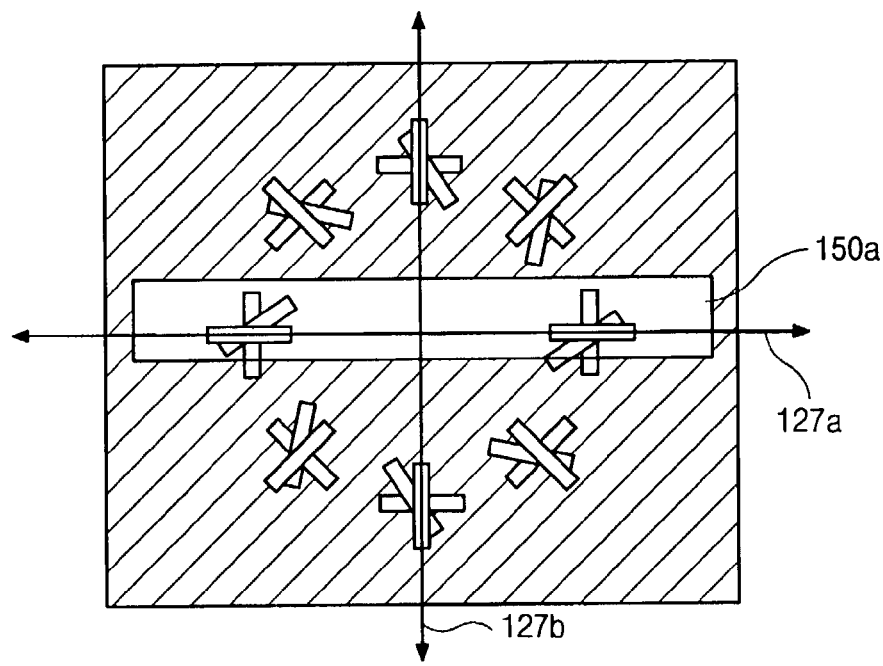
FIGS. 13A to 13C are views showing various shapes of the hole or the groove according to the present invention.
Figure 13B:
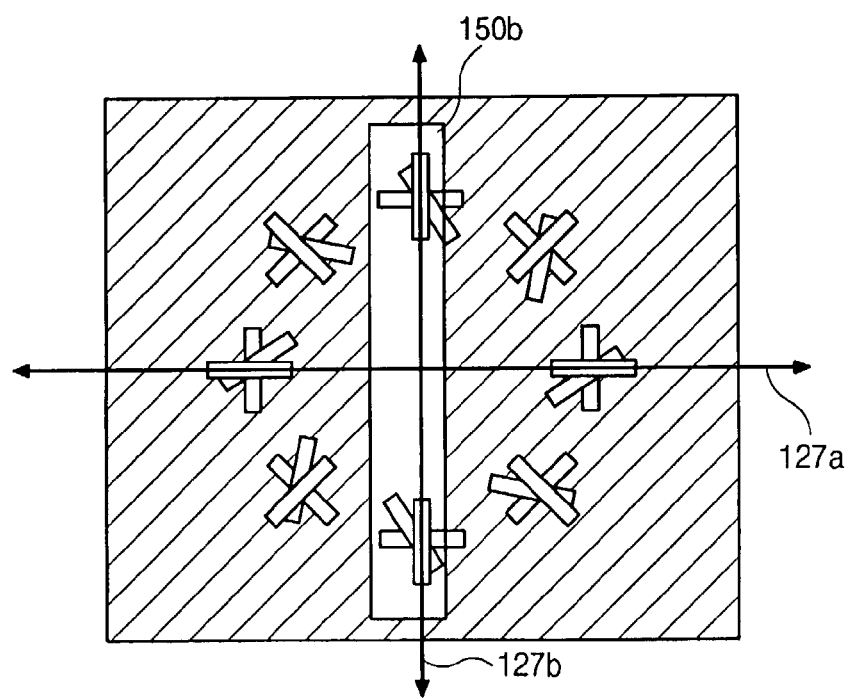
Figure 13C:
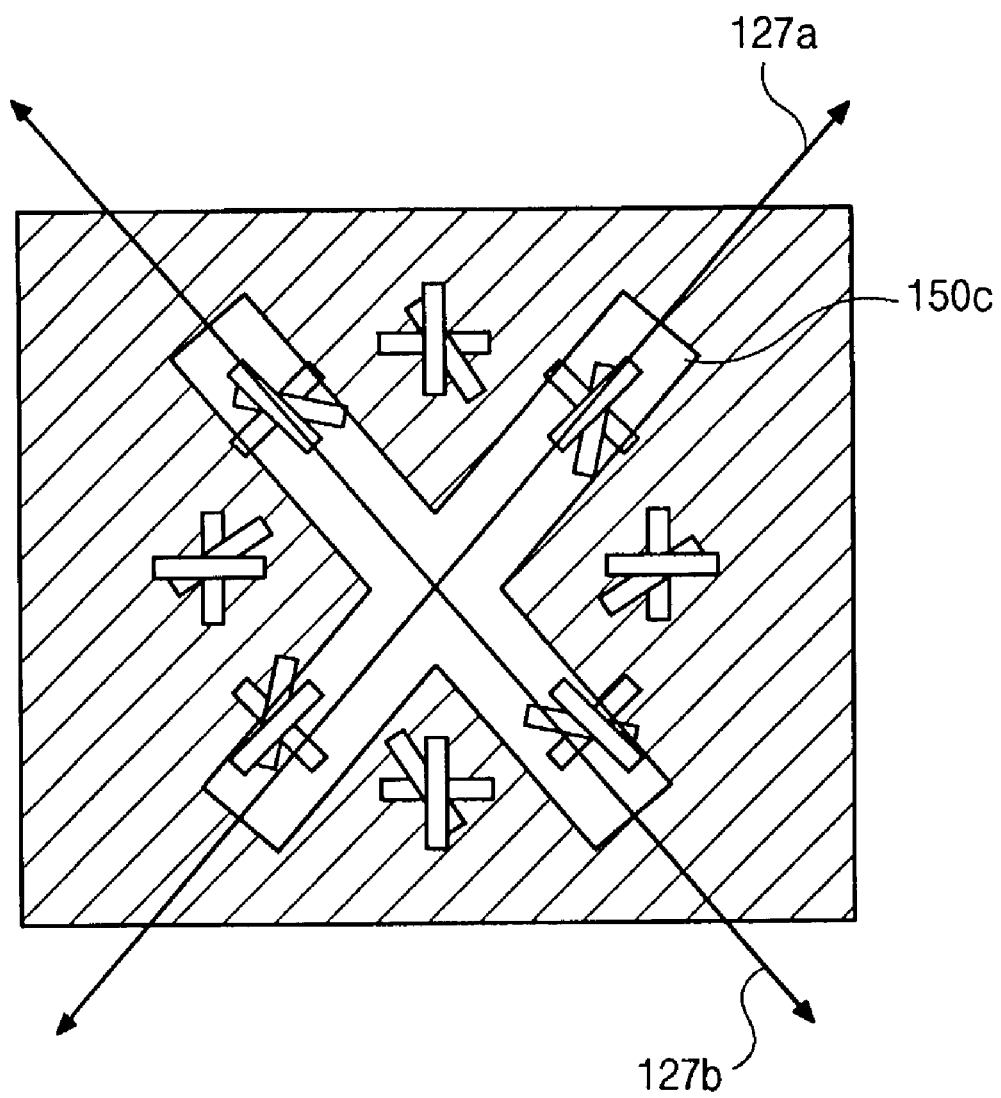

FIGS. 13A to 13C illustrate various shapes of the hole or the groove.

In FIG. 13A, the hole or the groove 150a has a stripe shape corresponding to (across) a width direction of the pixel. For example, the hole or the groove 150a is parallel to the optical axis 127a of the first polarizer 126 of FIG. 9.

Meanwhile, in FIG. 13B, the hole or the groove 150b has a stripe shape corresponding to (across) a length direction of the pixel. For example, the hole or the groove 150b is parallel to the optical axis 127b of the second polarizer 128 of FIG. 9.

As shown in FIG. 13C, the hole or the groove 150c may have a crisscross shape, which may correspond to diagonal lines of the pixel. Here, the hole or the groove 150c has portions parallel to the optical axes 127a and 127b of the first and second polarizers 126 and 128 of FIG. 9.

In the present invention, the VAC mode LCD device with the hole or the groove in the color filter layer not only has a wide viewing angle but also high brightness.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates;
   a first polarizer having a first optical axis on an outer surface of the first substrate;
   a second polarizer having a second optical axis on an outer surface of the second substrate;
   a gate line and a data line on the first substrate, the gate line and the data line crossing each other to define a pixel area;
   a thin film transistor electrically connected to the gate and data lines;
   a pixel electrode connected to the thin film transistor;
   a color filter layer including a plurality of sub-color filters on the second substrate, each of the sub-color filters including a at least two concave portions each substantially parallel to a diagonal line of each of the sub-color filters, wherein the at least two concave portions have the same length and a square shaped cross-section, and wherein one of the at least two concave portions is parallel to one of the first and second optical axes and another one of the at least two concave portions is parallel to the other of the first and second optical axes;

a common electrode on the color filter layer; and a liquid crystal layer between the first and second substrates, wherein the liquid crystal layer is for operating in a Vertical Alignment with chiral dopants (VAC) mode, and wherein the liquid crystal layer has a portion of liquid crystal molecules that are aligned parallel to one of the first and second optical axis when a voltage is applied between the pixel electrode and the common electrode.

2. The device according to claim 1, wherein the first concave portion corresponds to a width direction of the pixel electrode.

3. The device according to claim 1, wherein the first concave portion corresponds to a length direction of the pixel electrode.

4. The device of claim 1, wherein the second concave portion is parallel to one of the first and second optical axes.

5. The device according to claim 4, wherein the second concave portion is parallel to the other of the first and second optical axes of the first and second polarizers.

6. The device according to claim 5, wherein the first and second concave portions correspond to diagonal directions of the pixel electrode.

7. The device according to claim 1, wherein the second substrate is exposed through the first and second concave portions.

8. The device according to claim 1, wherein the second substrate is exposed through the first concave portion.

* * * * *